US008312442B2

(12) United States Patent
Song et al.

(10) Patent No.: US 8,312,442 B2
(45) Date of Patent: Nov. 13, 2012

(54) METHOD AND SYSTEM FOR INTERPROCEDURAL PREFETCHING

(75) Inventors: Yonghong Song, Palo Alto, CA (US); Spiros Kalogeropulos, Los Gatos, CA (US); Partha P. Tirumalai, Fremont, CA (US)

(73) Assignee: Oracle America, Inc. CA (US)

( * ) Notice: Subject to any disclaimer, the term of this patent is extended or adjusted under 35 U.S.C. 154(b) by 1007 days.

(21) Appl. No.: 12/331,999

(22) Filed: Dec. 10, 2008

(65) Prior Publication Data

US 2010/0146495 A1 Jun. 10, 2010

(51) Int. Cl.
*G06F 9/45* (2006.01)
(52) U.S. Cl. ............ 717/160; 717/150; 717/140; 712/7; 712/221; 711/147; 711/148
(58) Field of Classification Search ........................ None
See application file for complete search history.

(56) References Cited

U.S. PATENT DOCUMENTS

| | | | | |
|---|---|---|---|---|
| 5,701,435 A * | 12/1997 | Chi | ................ | 711/159 |
| 5,752,037 A * | 5/1998 | Gornish et al. | ................ | 717/160 |
| 5,754,876 A * | 5/1998 | Tamaki et al. | ................ | 712/4 |
| 5,933,643 A * | 8/1999 | Holler | ................ | 717/158 |
| 6,415,356 B1 * | 7/2002 | Chaudhry et al. | ................ | 711/118 |
| 6,507,947 B1 * | 1/2003 | Schreiber et al. | ................ | 717/160 |
| 6,560,693 B1 * | 5/2003 | Puzak et al. | ................ | 712/207 |
| 6,959,375 B2 * | 10/2005 | Nguyen et al. | ................ | 712/23 |
| 7,395,419 B1 * | 7/2008 | Gonion | ................ | 712/241 |
| 7,493,607 B2 * | 2/2009 | Moritz | ................ | 717/151 |
| 7,502,910 B2 * | 3/2009 | Damron | ................ | 712/34 |
| 7,631,305 B2 * | 12/2009 | Rong et al. | ................ | 717/161 |
| 7,739,530 B2 * | 6/2010 | Takayama et al. | ................ | 713/320 |
| 7,849,453 B2 * | 12/2010 | Tirumalai et al. | ................ | 717/160 |
| 7,950,012 B2 * | 5/2011 | Tirumalai et al. | ................ | 718/102 |
| 8,006,238 B2 * | 8/2011 | Eichenberger et al. | ................ | 717/150 |
| 8,065,502 B2 * | 11/2011 | Gonion | ................ | 712/7 |
| 8,104,030 B2 * | 1/2012 | Silvera et al. | ................ | 717/160 |
| 2005/0086652 A1 * | 4/2005 | Tian et al. | ................ | 717/151 |
| 2005/0097509 A1 * | 5/2005 | Rong et al. | ................ | 717/106 |
| 2005/0149915 A1 * | 7/2005 | Wu et al. | ................ | 717/137 |
| 2005/0210199 A1 * | 9/2005 | Dimpsey et al. | ................ | 711/137 |
| 2007/0022412 A1 * | 1/2007 | Tirumalai et al. | ................ | 717/140 |
| 2007/0050603 A1 * | 3/2007 | Vorbach et al. | ................ | 712/221 |
| 2007/0169057 A1 * | 7/2007 | Silvera et al. | ................ | 717/160 |
| 2008/0229298 A1 * | 9/2008 | O'Brien et al. | ................ | 717/160 |
| 2010/0122069 A1 * | 5/2010 | Gonion | ................ | 712/216 |

OTHER PUBLICATIONS

Title: Runtime Empirical Selection of Loop Schedulers on Hyperthreaded SMPs, author: Tun Zhang and Michael Voss, dated: Apr. 8, 2005, source: IEEE.*
Title: Run-time parallelization for partially parallel loops, author: Shian-Shyong Tseng et al, dated: Dec. 10, 1997 source: IEEE.*

(Continued)

*Primary Examiner* — Chameli Das
(74) *Attorney, Agent, or Firm* — Brooks Kushman P.C.

(57) ABSTRACT

A computing system has an amount of shared cache, and performs runtime automatic parallelization wherein when a parallelized loop is encountered, a main thread shares the workload with at least one other non-main thread. A method for providing interprocedural prefetching includes compiling source code to produce compiled code having a main thread including a parallelized loop. Prior to the parallelized loop in the main thread, the main thread includes prefetching instructions for the at least one other non-main thread that shares the workload of the parallelized loop. As a result, the main thread prefetches data into the shared cache for use by the at least one other non-main thread.

16 Claims, 2 Drawing Sheets

OTHER PUBLICATIONS

Damron et al., Hybrid Transactional Memory, ASPLOS '06, Oct. 21-25, 2006, San Jose, CA.

Kalogeropulos et al., Processor Aware Anticipatory Prefetching in Loops, HCPA-2004, Feb. 2004, Madrid, Spain.

* cited by examiner

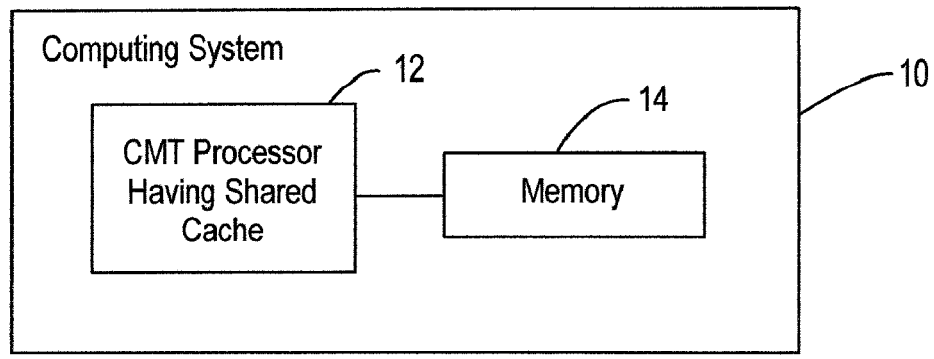
FIG. 1
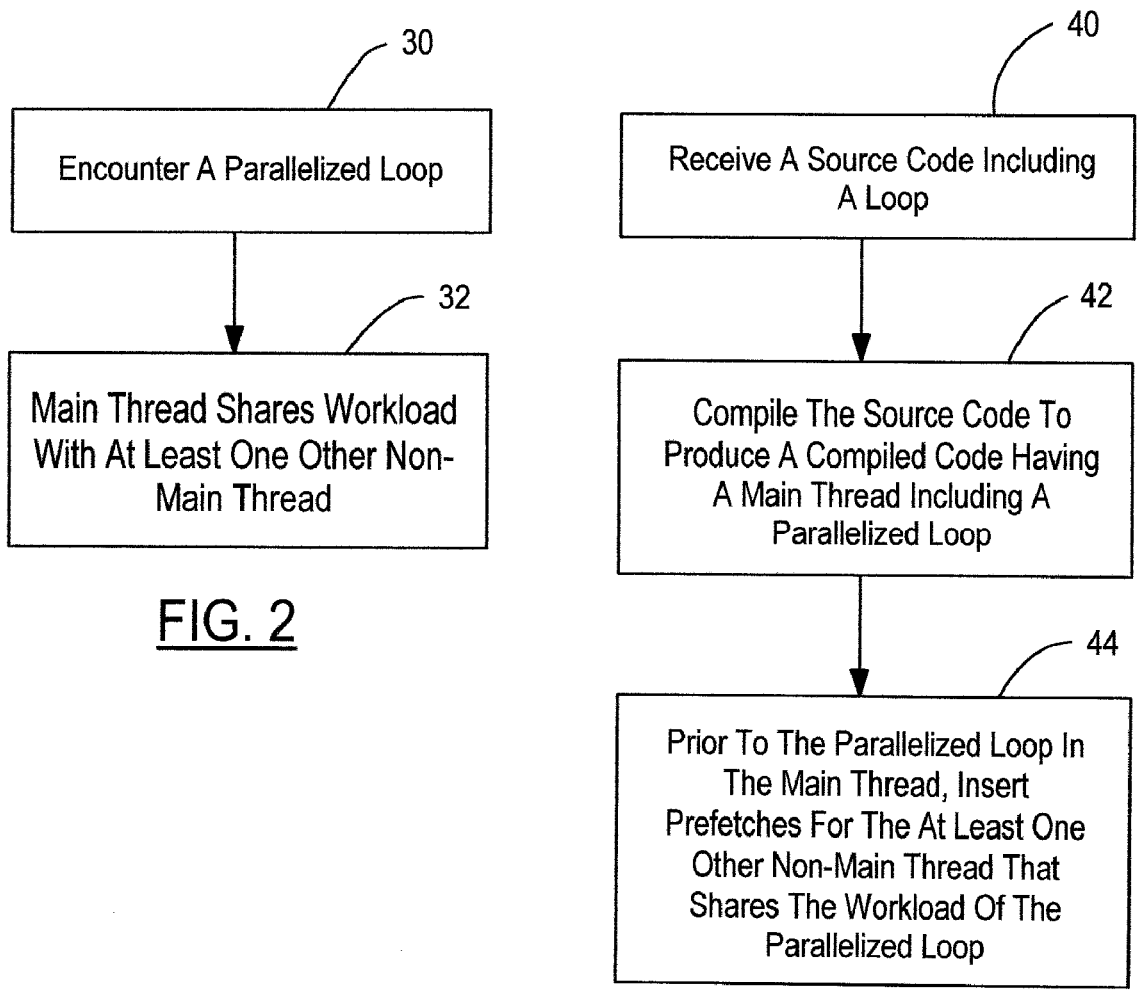
FIG. 2
FIG. 3

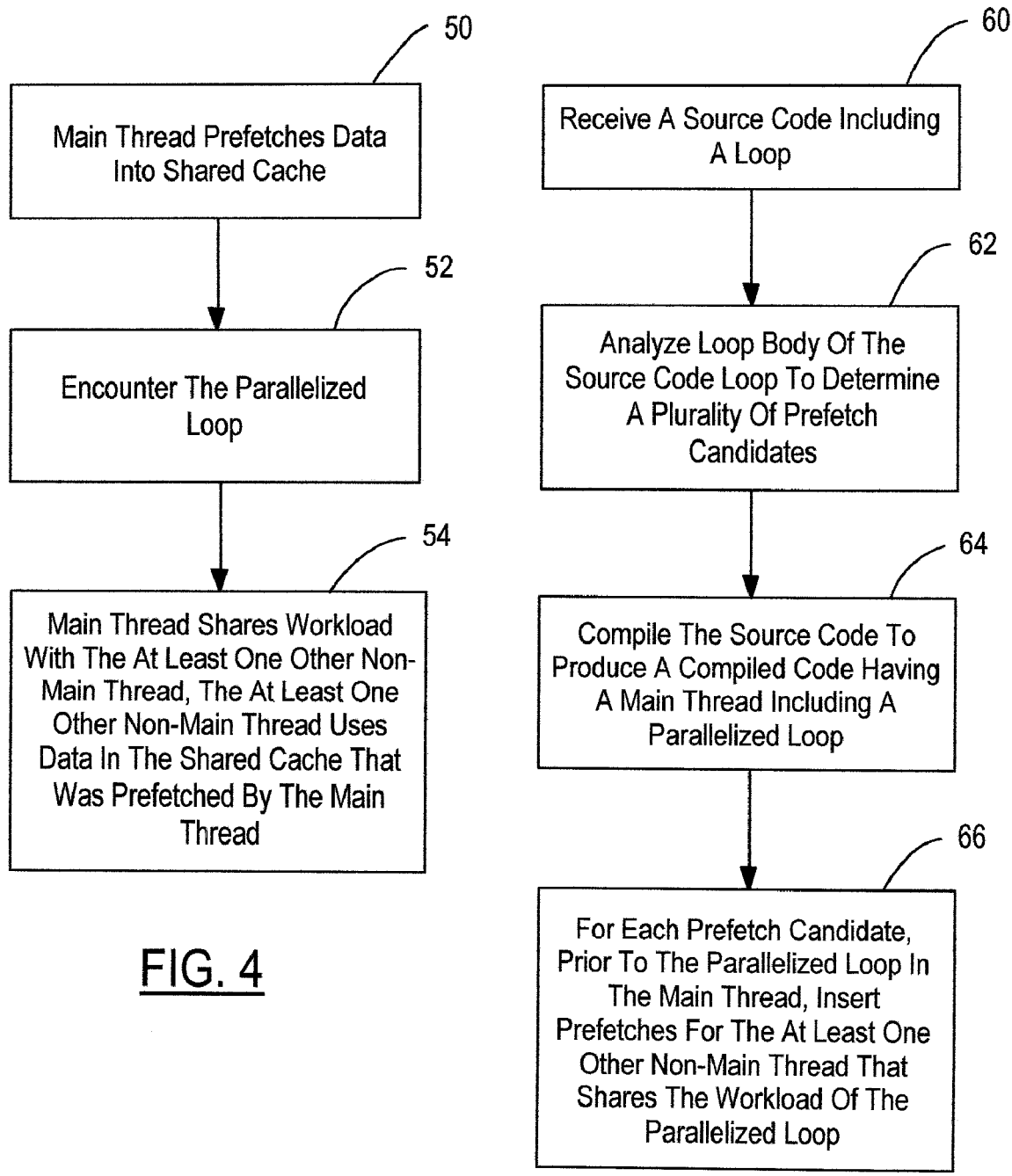

METHOD AND SYSTEM FOR INTERPROCEDURAL PREFETCHING

BACKGROUND OF THE INVENTION

1. Field of the Invention

The invention relates to automatic parallelization and to prefetching.

2. Background Art

Automatic parallelization has been studied and has been used commercially for a long time. Recent transactional memory hardware enables the possibility of speculative automatic parallelization. Speculative automatic parallelization will produce a parallel loop, even if the loop cannot be proven to be free of cross-loop dependencies at compile time. However, because of hardware limitations of transactional memory implementations, e.g., the number of stores cannot exceed a certain amount in order to avoid transaction failure, the workload for a speculative thread has to be small. In other words, the granularity of the parallel region cannot be too big.

At runtime of automatic parallelization, when a parallelized loop is encountered, a set of threads will be created or reused from previous creation. The original main thread will share the work with all other non-main threads. The non-main threads, however, often incur startup cost because the private cache and translation lookahead buffer (TLB) are not warmed up. Such startup cost is significant for speculative automatic parallelization because, as mentioned earlier, speculative automatic parallelization has small work granularity. The relatively large startup cost also negatively affects overall performance.

SUMMARY OF THE INVENTION

It is an object of the invention to provide a method and system for interprocedural prefetching, in which prefetches are inserted into the main thread to prefetch for the data which are needed in the main and non-main threads.

In one embodiment, a computing system has an amount of shared cache, and performs runtime automatic parallelization wherein when a parallelized loop is encountered, a main thread shares the workload with at least one other non-main thread. A method for providing interprocedural prefetching includes compiling source code to produce compiled code having a main thread including a parallelized loop. Prior to the parallelized loop in the main thread, the main thread includes prefetching instructions for the at least one other non-main thread that shares the workload of the parallelized loop. As a result, the main thread prefetches data into the shared cache for use by the at least one other non-main thread.

BRIEF DESCRIPTION OF THE DRAWINGS

FIG. 1 illustrates a computing system for performing runtime automatic parallelization;

FIG. 2 illustrates the performing of runtime automatic parallelization by the computing system;

FIG. 3 illustrates compiling for runtime automatic parallelization with interprocedural prefetching;

FIG. 4 illustrates the performing of runtime automatic parallelization with interprocedural prefetching by the computing system; and FIG. 5 illustrates, in further detail, compiling for runtime automatic parallelization with interprocedural prefetching, including analysis to determine prefetch candidates.

DETAILED DESCRIPTION OF THE PREFERRED EMBODIMENT

FIGS. 1-5, and the following description, describe example embodiments of the invention. Accordingly, the drawings and the description are only exemplary, and other embodiments of the invention are contemplated.

Further, in order to provide a better appreciation for embodiments of the invention, a description of parallelization code generation and prefetch ahead distance computation is provided below.

Parallelization Code Generation

Traditional automatic parallelization tries to parallelize loops which do not have cross-iteration dependencies, i.e., all the loop iterations can be executed at the same time. Traditional automatic parallelization tries to only parallelize loops which have large granularity. For such loops, startup cost only accounts for a small percentage of total execution time and is considered not important.

Recent hardware advances in transactional memory have enabled active research and experiments on speculative automatic parallelization. Hardware implementations, however, have limitations, e.g., the number of loads and stores cannot exceed a certain number in order to avoid transaction failure. Such hardware constraints will make loops with large granularity not suitable for speculative automatic parallelization. For small granularity loops, however, startup cost will affect performance significantly. Suppose the workload is evenly distributed among all threads without considering startup cost. By considering startup cost, the overall execution time will be increased by the amount of the startup cost.

Currently, most automatic parallelization is implemented with a fork-join model. The original main thread will fork a set of non-main threads such that the work in a parallel loop will be shared among all threads. The thread management and work partitioning task are often processed in a separate parallelization library. The following example gives a simplified view of compiler code generation and interaction between the compiler and the parallelization library.

Suppose the following example:

```
for (i = 1; i <= n; i++) {
    a[i] = b[i] + foo (i);
}
```

The compiler will replace the above original code with:

```
/* Parameters to pass to parallelization library */
parameters.lower = 1;
parameters.upper = n;
parameters.step = 1;
parameters.speculative = 1; /* the loop is speculatively parallelized */
parameters.outlined_func = _outlined_$func1_;
......
/* pass in arguments for the outlined routine */
pass_in_argvs[0] = a;
pass_in_argvs[1] = b;
_MasterFunc_spec_ (&parameters, pass_in_argvs, ...)
```

The function_outlined_$func1_ is the outlined function for the original loop, and looks like:

```
_outlined_$func1_ (pass_in_argvs, lower, upper, ...)
copy_in_a = pass_in_argvs[0];
copy_in_b = pass_in_argvs[1];
for (private_i = lower; private_i <= upper; private_i++) {
    copy_in_a[private_i] = copy_in_b[private_i] + foo (private_i);
}
```

The function_MasterFunc_spec_ is defined in the parallelization library. The function_MasterFunc_spec_ will partition the original work among multiple threads, and also handle synchronization between different threads.

The parallelization library will apply a scheduling policy, which is determined and passed in by the compiler, to partition work among multiple threads. There are many different scheduling policies. The most common scheduling policy is called "static" scheduling, which tries to distribute original work evenly across all threads.

Prefetch Ahead Distance Computation

Given a loop nest, the compiler will perform some prefetch analysis to identify prefetch candidates and will also calculate prefetch ahead distance for each candidate. Furthermore, the prefetch instructions will be inserted into the loop body based on identified prefetch candidates and computed prefetch ahead distance.

The prefetch ahead value for constant and register (unknown constant but invariant) strides will be computed differently. If the stride is a constant stride then the prefetch ahead value is computed by the following formula, prefetch_ahead_value=prefetch_ahead_distance*stride, where prefetch_ahead_distance is computed by the following formula;

prefetch_ahead_distance=min(covered_latency, prefetch_queue_utilization), covered_latency=prefetch_latency/ (prefetch_cover_distance*exec_time_single_iter), where exec_time_single_iter is the execution time of a single iteration and is computed by summing up the weighed execution time of each basic block in the loop. The weight of each block in the loop is the probability to execute the block relative to the loop header. The prefetch_queue_utilization value is given by, prefetch_queue_utilization=outstanding_prefetches/ prefetch_candidates, where outstanding_prefetches represents the number of prefetch instructions held in the prefetch queue of the target processor. Prefetch_candidates represents the number of prefetch instructions which will be emitted.

If the stride is a register stride then the prefetch ahead distance is computed by multiplying the stride register by the prefetch_ahead_distance term defined earlier. A shift instruction which is faster than a multiplication instruction can be used to approximate the multiplication of the stride register by the prefetch_ahead_distance.

In the above, it is assumed that hardware supports a limited number of outstanding prefetches (outstanding_prefetches). If the hardware does not have such a limitation, the compiler can designate outstanding_prefetches as MAX_INT (maximum integer number). Basically, this relaxes the hardware constraint and makes the hardware constraint irrelevant to the final result as other factors will determine the prefetch ahead distance.

Processor aware anticipatory prefetching in loops is described in Spiros Kalogeropulos, Rajagopalan Mahadevan, Vikram Rao, Yonghong Song, Partha Tirumalai, *Processor Aware Anticipatory Prefetching in Loops,* HCPA-2004, February, 2004, Madrid, Spain, which is hereby incorporated by reference.

Interprocedural Prefetching

Given a loop, the compiler will analyze whether the loop can be parallelized, speculatively parallelized or not at all. If the compiler decides the compiler will parallelize this loop, the compiler will also determine the scheduling policy. Since the compiler knows how the work is partitioned, the compiler is able to do some transformation to help reduce the startup cost for the non-main threads.

As stated earlier, for the outline routine, the compiler will be able to issue prefetches in the loop to cover memory latency for potential cache misses. However, the issued prefetches inside the loop cannot prevent cache misses for the first few references of prefetch candidates. Some prefetches may be inserted before the loop to cover the latency for these few references, but those prefetches may not cover the long memory latency.

If a certain level of cache is shared, which is the case for L2 cache or L3 cache for most chip multithreading (CMT) processors, prefetches can be inserted in the main thread to prefetch data needed by the main and all other non-main threads in their corresponding first few iterations. The compiler needs to determine what to prefetch and where to prefetch.

For where to prefetch, the compiler will place prefetch instructions before passing the control to the parallelization library. In many cases, the number of threads is not known until runtime, the compiler will generate a loop to prefetch for each thread.

For what to prefetch, the compiler will analyze the loop body and do a reuse/prefetch analysis. For each identified prefetch candidate, if the address whose corresponding memory will be accessed by each thread can be pre-computed at compile time as a function of the loop index variable, the compiler will issue certain prefetch instructions for this address for each thread. Note that such prefetch candidates will have a constant or invariant stride at compile time. If the future address cannot be pre-calculated at compile time as a function of the loop index variable, e.g., link list type of memory access, the compiler will have to give up.

The following is an example,

```
for (i = 1; i <= n; i++) {
    a[i] = b[i] + foo (i);
}
```

The compiler will decide that a[i] and b[i] can be prefetched interprocedurally. First, what prefetches will be inserted for the main thread are calculated. The compiler will first calculate a prefetch ahead value such that the following references will be prefetched for the main thread in the outlined function;

a[i+prefetch_ahead_distance], and b[i+prefetch_ahead_distance].

Note that in the outlined function, if not prefetched interprocedurally, the first few "a" and "b" references tend to miss. The interprocedural prefetching wants to prefetch for cache lines covering addresses of a[1] to a[1+prefetch_ahead_distance], and of b[1] to b[1+prefetch_ahead_distance], not including cache lines where a[1+prefetch_ahead_distance] and b[1+prefetch_ahead_distance] reside.

In order to avoid cache misses for the first few references of prefetch candidates, for each prefetch candidate, the number of cache lines to be prefetched should be prefetch_ahead_value/cache_line_size, where cache_line_size is the cache line size for the shared cache. Once the candidates and prefetch ahead distances are calculated for the main thread, calculations can be done similarly for other non-main threads by considering scheduling policy. Suppose the scheduling policy is "static" scheduling. To reduce the startup cache misses for each non-main thread, the interprocedural prefetching wants to prefetch for cache lines covering addresses of a[new_lower] to a[new_lower+prefetch_ahead_distance], and of b[new_lower] to b[new_lower+prefetch_ahead_distance], not including cache lines where a[new_lower+prefetch_ahead_distance] and b[new_lower+prefetch_ahead_distance] reside, where new_lower is the start loop index value for the non-main thread.

The ideal interprocedural prefetches will prefetch for all candidates with adequate number of prefetches per thread:

ideal_num_prefetches_per_thread=SUM_for_all_candidates (prefetch_ahead_value/cache_line_size), where SUM_for_all_candidates tries to sum the number of needed prefetches for all candidates. Note that here different prefetch candidates may have different prefetch_ahead_value.

However, the hardware may only have limited prefetch queues to hold all prefetches; therefore, the maximum number of prefetches per thread should not exceed:

max_num_prefetches_per_thread=outstanding_prefetches/num_threads where num_threads is the number of threads sharing the original work.

If ideal_num_prefetches_per_thread is less than or equal to max_num_prefetches_per_thread, then all interprocedural prefetch instructions which improve performance can be issued. Otherwise, the compiler needs to make compromises to limit the number of prefetches issued at compile time. Different schemes exist. Here, one of them is presented.

```
    . calculate the number of prefetches the compiler should trim
from the ideal case:
        extra_num_prefetches_per_thread =
    ideal_num_prefetches_per_thread −
    max_num_prefetches_per_thread.
            . following certain order (or random order):
        for each candidate,
            if (extra_num_prefetches_per_thread is equal to 0) then
                done with work and exit from the loop.
            else if (extra_num_prefetches_per_thread >
    prefetch_ahead_value/cache_line_size) then
                final_num_prefetches_per_thread (candidate) = 0.
                extra_num_prefetches_per_thread =
    extra_num_prefetches_per_thread −
    prefetch_ahead_value/cache_line_size.
            else
                final_num_prefetches_per_thread (candidate) =
    prefetch_ahead_value/cache_line_size −
    extra_num_prefetches_per_thread.
                extra_num_prefetches_per_thread = 0.
            endif
        end for
```

For each candidate, the above algorithm computes:

final_num_prefetches_per_thread (candidate), which is the ultimate number of prefetches per thread for that candidate. The final_num_prefetches_per_thread (candidate) could be 0.

If all final_num_prefetches_per_thread(candidate) are 0, then no interprocedural prefetches will be issued. This can happen with smaller outstanding_prefetches, larger num_threads, and larger num_prefetch_candidates.

If some final_num_prefetches_per_thread(candidate) are greater than 0, interprocedural prefetches will be issued. The compiler will issue final_num_prefetches_per_thread(candidate) per thread for the "candidate."

The following is an example code with prefetches inserted, assuming a static scheduling of threads.

```
/* prefetching for the non-main threads */
tc = ceiling (n/num_threads);
for (k = 0; k < num_threads; k++) {
    prefetch (&(a[1 + k * tc]));
    prefetch (&(a[1 + k * tc + cache_line_size]));
    ......
    prefetch (&(a[1 + k * tc + cache_line_size *
(final_num_prefetches_per_thread(candidate_a) − 1)]));
    prefetch (&(b[1 + k * tc]));
    prefetch (&(b[1 + k * tc + cache_line_size]));
    ......
    prefetch (&(b[1 + k * tc + cache_line_size *
(final_num_prefetches_per_thread(candidate_b) − 1)]));
}
/* Parameters to pass to parallelization library */
parameters.lower = 1;
parameters.upper = n;
parameters.step = 1;
parameters.speculative = 1; /* the loop is speculatively parallelized */
parameters.outlined_func = _outlined_$func1_;
......
/* pass in arguments for the outlined routine */
pass_in_argvs[0] = a;
pass_in_argvs[1] = b;
_MasterFunc_spec__ (&parameters, pass_in_argvs, ...)
```

Note the prefetches inserted in the main thread, located before the code generated for parallelization. In contrast, with traditional compiler code generation, the main thread does not include these prefetches.

Note that since prefetching instructions are inserted in the main thread, this may potentially increase the running time for the main thread. In order to reduce the total execution time, the execution time saving for each non-main thread must be greater than added execution time for the main thread.

Let prefetch_overhead be the added execution time for the main thread due to prefetching. Let prefetch_benefit be the saved execution time for each non-main thread due to saved latency from memory to shared cache, which can be calculated as the summation of latency difference (shared cache vs. memory) for all prefetch candidates. If the prefetch_benefit is greater than prefetch_overhead, prefetching instructions will be inserted in the main thread. In most cases, prefetch_benefit will be greater than prefetch_overhead, considering low overhead for prefetching instructions.

At compile time, the compiler may not know the value of num_threads. The compiler can get the value from an environment variable, make an assumption (say 2 threads) or the value can be supplied by the user.

In the disclosure above, to minimize the overhead imposed to the main thread, only prefetch candidates of direct memory accesses are considered. That is, the address generation of the prefetch candidate will not involve any memory loads in the loop body. The below candidate c[b[i]] will not be considered in this scheme.

```
for (i = 1; i <= n; i++) {
    a[i] = c[b[i]] + foo (i);
}
```

Otherwise, such loads (load b[i] in c[b[i]]), which will be become speculative or non-faulting loads in the prefetch address generation, may increase overhead in the main thread significantly. Although not specifically presented here, this scheme can be extended to consider such overhead in a profitability test and consider indirect memory prefetching in an interprocedural prefetch framework.

Turning now to FIGS. 1-5, further examples of the invention are illustrated. In FIG. 1, a computing system 10 for performing runtime automatic parallelization includes a chip multithreading (CMT) processor 12, and memory 14. FIG. 2 illustrates the performing of runtime automatic parallelization by the computing system 10. As indicated at block 30, the processor 12 encounters a parallelized loop. Accordingly, and as indicated at block 32, the main thread of execution shares the workload with at least one other non-main thread.

Turning to FIG. 3, compiling for runtime automatic parallelization with interprocedural prefetching is illustrated. At block 40, the compiler receives a source code including a loop. At block 42, the source code is compiled to produce a compiled code having a main thread including a parallelized loop. This parallelized loop corresponds to the source code loop. As shown at block 44, prior to the parallelized loop in the main thread, the main thread includes prefetches inserted by the compiler to prefetch for the at least one other non-main thread that shares the workload of the parallelized loop. In this way, the main thread will prefetch data into the shared cache for use by the other non-main threads.

Turning to FIG. 4, the performing of runtime automatic parallelization with interprocedural prefetching by the computing system is illustrated. At block 50, the main thread prefetches data into the shared cache of the processor 12 (by executing the prefetches inserted by the compiler). When the parallelized loop is encountered at block 52, the loop is executed in parallel. As shown at block 54, the main thread shares the workload with the at least one other non-main thread. The threads use data in the shared cache that was prefetched by the main thread prior to the parallelized loop.

FIG. 5 illustrates, in further detail, compiling for runtime automatic parallelization with interprocedural prefetching, including analysis to determine prefetch candidates. At block 60, a source code including a loop is received. At block 62, a loop body of the source code loop is analyzed to determine a plurality of prefetch candidates. It is also possible that only a single prefetch candidate is determined. Block 64 indicates the compiling of the source code to produce a compiled code having a main thread including a parallelized loop.

As shown at block 66, for each prefetch candidate, prior to the parallelized loop in the main thread, prefetches are inserted for (the main thread and) the at least one non-main thread that shares the workload of the parallelized loop. In more detail, for each prefetch candidate, at least one of a plurality of references to the prefetch candidate is prefetched. As discussed above, the prefetches made by the main thread provide data for the one or more other threads. As well, the prefetching may be limited during compiling based on hardware limitations of the computing system, or may be subject to a cost/benefit analysis, as discussed previously.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of interprocedural prefetching for runtime automatic parallelization in a computing system, the computing system performing runtime automatic parallelization wherein when a parallelized loop is encountered, a main thread shares workload with at least one other non-main thread, and wherein an amount of cache is shared, the method comprising:

receiving source code including a loop;

compiling the source code to produce compiled code having a main thread including a parallelized loop, the parallelized loop corresponding to the source code loop, wherein prior to the parallelized loop in the main thread, the main thread includes prefetching instructions to prefetch data into the shared cache for use by the at least one other non-main thread;

analyzing a loop body of the source code loop to determine at least one prefetch candidate, wherein for at least one reference to a prefetch candidate, the main thread includes prefetching instructions for the at least one reference, prior to the parallelized loop in the main thread; and inserting prefetching instructions into the main thread prior to the parallelized loop corresponding to a prefetch ahead value divided by a cache line size associated with the shared cache.

2. The method of claim 1 wherein analyzing a loop body comprises:

analyzing a loop body of the source code loop to determine a plurality of prefetch candidates, wherein for each prefetch candidate, for at least one reference to a particular prefetch candidate, the main thread includes prefetching instructions for the at least one reference, prior to the parallelized loop in the main thread.

3. The method of claim 1 wherein the prefetching included in the main thread for the at least one other non-main thread is limited during compiling based on computing system hardware limitations.

4. The method of claim 1 wherein the parallelized loop included in the main thread is a speculatively parallelized loop.

5. The method of claim 1 further comprising:

determining a sum of prefetches for all prefetch candidates; and limiting a number of prefetches for each candidate to the sum of prefetches for all prefetch candidates divided by a number of threads corresponding to the main thread and the at least one other non-main thread sharing the workload.

6. The method of claim 5 wherein inserting prefetching instructions into the main thread is performed only for candidates having direct memory accesses to reduce overhead imposed on the main thread.

7. The method of claim 1 wherein the main thread includes prefetching instructions only for threads having direct memory accesses.

8. A method of interprocedural prefetching for runtime automatic parallelization in a computing system, the computing system performing runtime automatic parallelization wherein when a parallelized loop is encountered, a main thread shares workload with at least one other non-main thread, and wherein the computing system includes shared cache, the method comprising:

receiving a source code including a loop;
compiling the source code to produce compiled code having a main thread including a parallelized loop, the parallelized loop corresponding to the source code loop;
analyzing a loop body of the source code loop to determine at least one prefetch candidate, wherein for at least one reference to a prefetch candidate, the main thread includes prefetching instructions for the at least one reference, prior to the parallelized loop in the main thread;
inserting prefetching instructions into the main thread prior to the parallelized loop corresponding to a prefetch ahead value divided by a cache line size associated with the shared cache; and
during compiling, determining a prefetch overhead as an added execution time for the main thread associated with prefetch instructions that are inserted prior to the parallelized loop in the main thread to prefetch for at least one other non-main thread that shares the workload of the parallelized loop,
determining a prefetch benefit as the saved execution time for the at least one other non-main thread due to the prefetching,
comparing the prefetch overhead to the prefetch benefit, and
when the prefetch benefit is greater than the prefetch overhead, inserting the prefetch instructions prior to the parallelized loop in the main thread so that the main thread prefetches data into the shared cache for use by the at least one other non-main thread sharing the workload of the parallelized loop.

9. The method of claim 8 wherein analyzing comprises:
analyzing a loop body of the source code loop to determine a plurality of prefetch candidates, wherein for each prefetch candidate, for a plurality of references to a particular prefetch candidate, the main thread includes prefetching instructions for the plurality of references, prior to the parallelized loop in the main thread.

10. The method of claim 9 wherein, for at least one prefetch candidate, the prefetching for the plurality of references occurs such that the main thread prefetches data into the shared cache for use by a plurality of other non-main threads.

11. The method of claim 9 wherein, for multiple prefetch candidates, the prefetching for the plurality of references occurs such that the main thread prefetches data into the shared cache for use by a plurality of other non-main threads.

12. The method of claim 8 wherein the prefetching included in the main thread for the at least one other non-main thread is limited during compiling based on computing system hardware limitations.

13. The method of claim 8 further comprising:
determining a sum of prefetches for all prefetch candidates; and
limiting a number of prefetches for each candidate to the sum of prefetches for all prefetch candidates divided by a number of threads corresponding to the main thread and the at least one other non-main thread sharing the workload.

14. The method of claim 13 wherein inserting prefetching instructions into the main thread is performed only for candidates having direct memory accesses to reduce overhead imposed on the main thread.

15. The method of claim 8 wherein the main thread includes prefetching instructions only for threads having direct memory accesses.

16. A non-transitory computer readable storage medium having information stored thereon to direct a computer to:
compile a source code including a loop to produce a compiled code having a main thread including a parallelized loop corresponding to the source code loop, analyze a loop body of the source code loop to determine at least one prefetch candidate, wherein for at least one reference to a prefetch candidate, the main thread includes prefetching instructions for the at least one reference, prior to the parallelized loop in the main thread, and insert prefetching instructions into the main thread prior to the parallelized loop corresponding to a prefetch ahead value divided by a cache line size associated with a shared cache the compiled code being suitable for runtime automatic parallelization in a computing system wherein when the parallelized loop is encountered, the main thread shares workload with at least one other non-main thread, and wherein an amount of cache in the computing system is shared, wherein prior to the parallelized loop in the main thread, the main thread includes prefetching instructions for the at least one other non-main thread that shares the workload of the parallelized loop, whereby the main thread prefetches data into the shared cache for use by the at least one other non-main thread.

* * * * *